No. 760,712. PATENTED MAY 24, 1904.
E. W. SMITH.
STORAGE BATTERY PLATE.
APPLICATION FILED SEPT. 10, 1903.
NO MODEL.
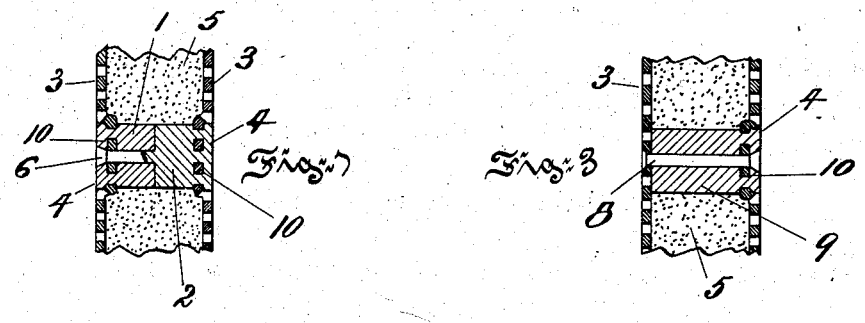
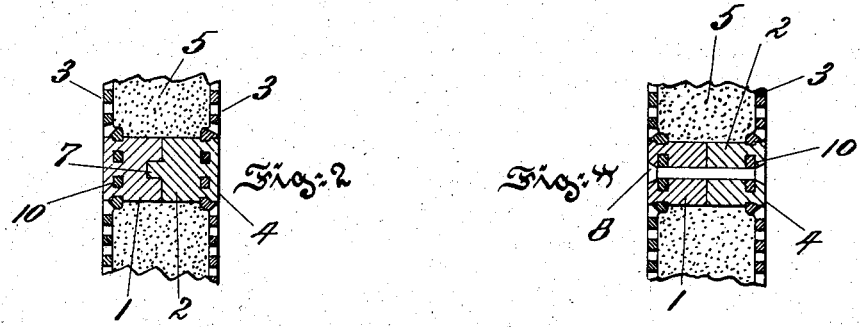
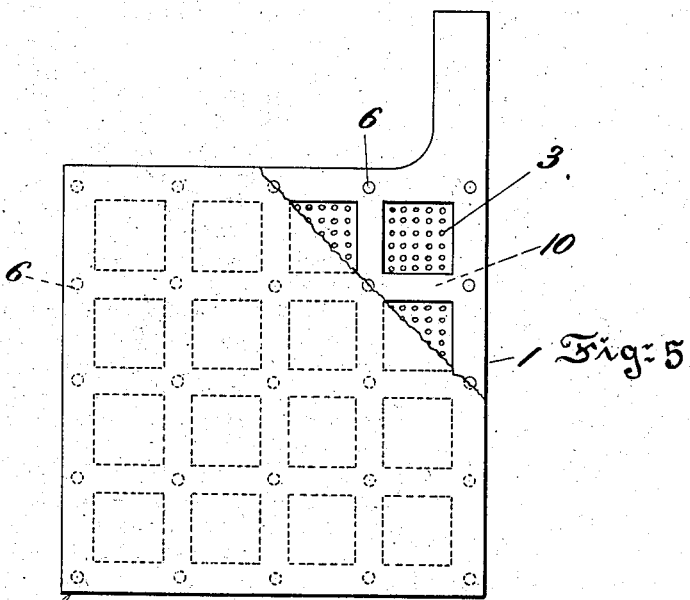
WITNESSES: INVENTOR.
Edward Wanton Smith.
BY
Augustus B. Stoughton.
ATTORNEY.

No. 760,712. Patented May 24, 1904.

UNITED STATES PATENT OFFICE.

EDWARD WANTON SMITH, OF PHILADELPHIA, PENNSYLVANIA, ASSIGNOR TO ELECTRIC STORAGE BATTERY COMPANY, OF PHILADELPHIA, PENNSYLVANIA, A CORPORATION OF NEW JERSEY.

STORAGE-BATTERY PLATE.

SPECIFICATION forming part of Letters Patent No. 760,712, dated May 24, 1904.

Application filed September 10, 1903. Serial No. 172,542. (No model.)

*To all whom it may concern:*

Be it known that I, EDWARD WANTON SMITH, a citizen of the United States, residing in Philadelphia, county of Philadelphia, and State of Pennsylvania, have invented certain new and useful Improvements in Storage-Battery Plates, of which the following is a specification.

There is a type of storage-battery plate which comprises, in general terms, a grid having the faces of its respective openings covered by a perforated sheet or sheets.

It is the principal object of the present invention to provide for economically and efficiently securing the perforated cover-plate to the grid.

To this and other ends hereinafter set forth the invention, stated in general terms, comprises the improvements to be presently described and finally claimed.

The nature, characteristic features, and scope of the invention will be more fully understood from the following description, taken in connection with the accompanying drawings, forming part hereof, and in which—

Figure 1 is a sectional view of a portion of a plate fitted with means for connecting the grid and perforated cover-plate which embody features of the invention. Figs. 2, 3, and 4 are similar views embodying modifications of the invention, and Fig. 5 is a face view taken from the left of Fig. 1 and showing a complete plate.

Referring to the drawings, and more particularly to Fig. 1, the grid is shown as made in two parts 1 and 2, which meet at or about the middle of the plate, although the point of meeting is not material.

3 designates the perforated cover-plates, and they are secured to the grid by means of projections 4, which are cast with and extend from the grid and engage the perforations in the cover-plate, as shown. The cover-plates are provided with corrugations or grooves 10, arranged in alinement with the bars of the grid, so that the lead which is cast from the grid through the perforations in the cover-plate serves to fill these grooves or corrugations.

5 designates active material. It is convenient to cast half of the grid and its projections onto one of the cover-plates by means of a suitable mold and to then properly position the active material and to finally secure the two parts of the grid together. As shown in Fig. 1, this is accomplished by means of a rivet 6, projecting from half of the grid and adapted to penetrate an opening in the other half.

In Fig. 2 there is illustrated a modification of means for securing the two parts of the grid together. In that figure, 7 is what may be called a "dowel-rivet," which projects from half of the grid and is tightly fitted into a socket formed in the other half of the grid, the requisite tightness, if necessary, being secured by applying pressure to the halves of the grid, so as to force them together.

As shown in Figs. 3 and 4, the rivet 8 is separate and extends through the plate. In Fig. 3 the described cast projections are employed only upon one side of the plate, the cover-plate on the other side being secured by the rivet 8, and, furthermore, the grid 9 is made in one part instead of two.

It will be obvious to those skilled in the art to which my invention relates that modifications may be made in details without departing from the spirit thereof. Hence I do not limit myself to the precise construction and mode of procedure hereinabove set forth; but,

Having thus described the nature and objects of my invention, what I claim as new, and desire to secure by Letters Patent, is—

1. Means for connecting the grid and perforated cover-plate, which comprise grooves in the cover-plate, and projections cast from the grid and engaging perforations of the plate and occupying the grooves thereof, substantially as described.

2. A plate consisting of a two-part grid, perforated cover-plates for the faces of the plate, projections cast from the grid and engaging perforations of the plate, and rivets for securing the parts of the grid together, substantially as described.

3. A plate consisting of a two-part grid, perforated cover-plates for the faces of the plate, projections cast from the grid and engaging perforations of the plate, and rivets integral with one of said parts for securing the parts together, substantially as described.

4. A plate consisting of a two-part grid whereof each part is provided with projections cast from the grid and engaging perforations of the plate, a perforated cover-plate for each of the faces of the plate, and whereof one part is provided with a projection which locks the other part, substantially as described.

In testimony whereof I have hereunto signed my name.

EDWARD WANTON SMITH.

In presence of—
BRUCE FORD,
GEO. M. HOWARD.